United States Patent
Kwon (10) Patent No.: US 12,475,420 B2
(45) Date of Patent: Nov. 18, 2025

(54) ACTIVELY LEARNING AND ADAPTING A WORKFLOW

(71) Applicant: TOYOTA RESEARCH INSTITUTE, INC., Los Altos, CA (US)

(72) Inventor: Ha-Kyung Kwon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 3 days.

(21) Appl. No.: 17/674,298

(22) Filed: Feb. 17, 2022

(65) Prior Publication Data

US 2023/0259851 A1 Aug. 17, 2023

(51) Int. Cl.
- *G06Q 10/063* (2023.01)
- *G01N 1/28* (2006.01)
- *G06Q 10/0633* (2023.01)
- *G06Q 10/0637* (2023.01)

(52) U.S. Cl.
CPC ........... *G06Q 10/0633* (2013.01); *G01N 1/28* (2013.01); *G06Q 10/0637* (2013.01)

(58) Field of Classification Search
None
See application file for complete search history.

(56) References Cited

U.S. PATENT DOCUMENTS

| | | | | |
|---|---|---|---|---|
| 5,025,222 A | * | 6/1991 | Scott | G01N 22/00 324/641 |
| 9,489,630 B2 | * | 11/2016 | Achin | G06Q 10/067 |
| 9,702,858 B1 | * | 7/2017 | Minvielle | A47J 36/321 |
| 10,255,409 B2 | | 4/2019 | Kisiel et al. | |
| 10,361,802 B1 | * | 7/2019 | Hoffberg-Borghesani | G06F 3/00 |
| 10,683,325 B2 | * | 6/2020 | Thomas, III | C07K 1/045 |

(Continued)

FOREIGN PATENT DOCUMENTS

| | | | | |
|---|---|---|---|---|
| CN | 112785194 A | * | 5/2021 | ......... G06F 16/9535 |
| EP | 3696619 A1 | * | 8/2020 | ....... G05B 19/41885 |

OTHER PUBLICATIONS

Y. Xiang and D. LaVan, "Parallel Microfluidic Synthesis of Conductive Biopolymers," 2006 2nd IEEE/ASME International Conference on Mechatronics and Embedded Systems and Applications, Beijing, China, 2006 (Year: 2006).*

(Continued)

*Primary Examiner* — Jerry O'Connor
*Assistant Examiner* — Philip N Warner
(74) *Attorney, Agent, or Firm* — Seyfarth Shaw LLP (57) ABSTRACT

A method for adjusting a workflow includes obtaining, at a current time step, one or more samples from the workflow. The method also includes determining a set of sample parameters based on obtaining the one or more samples. Each sample parameter of the set of sample parameters may be associated with a respective sample of the one or more samples. The method further includes generating an updated model by updating an initial model associated with the workflow based on determining the set of sample parameters. The method still further includes adjusting one or more workflow parameters based on the updated model. The one or more workflow parameters may be adjusted such that a currently predicted end result of the workflow converges with an expected end result of the workflow.

17 Claims, 4 Drawing Sheets

(56) References Cited

U.S. PATENT DOCUMENTS

| | | | | |
|---|---|---|---|---|
| 2006/0061547 | A1* | 3/2006 | Bramwell | G06Q 10/06 |
| | | | | 702/179 |
| 2007/0003941 | A1* | 1/2007 | Olson | C40B 99/00 |
| | | | | 702/19 |
| 2007/0050070 | A1* | 3/2007 | Strain | G06Q 10/06 |
| | | | | 700/99 |
| 2009/0306311 | A1* | 12/2009 | Reed | G01N 21/82 |
| | | | | 422/119 |
| 2012/0107175 | A1* | 5/2012 | Satyamurthy | B01J 19/126 |
| | | | | 422/68.1 |
| 2016/0371616 | A1* | 12/2016 | Nicholas | G08B 21/18 |
| 2019/0193147 | A1* | 6/2019 | Navarro Teixidó | B22D 21/007 |
| 2019/0392088 | A1* | 12/2019 | Duff | G02B 27/0172 |
| 2020/0166909 | A1* | 5/2020 | Noone | G06N 20/00 |
| 2020/0393810 | A1* | 12/2020 | Kempf | G05B 23/0267 |
| 2021/0127701 | A1* | 5/2021 | Höhener | A23G 1/16 |
| 2021/0155978 | A1* | 5/2021 | Tidd | B01L 9/06 |
| 2021/0241142 | A1* | 8/2021 | Georgiou | G06N 5/04 |
| 2021/0261374 | A1* | 8/2021 | Celli | B65H 18/08 |
| 2021/0317320 | A1* | 10/2021 | Hyland | C09D 133/12 |
| 2021/0388547 | A1* | 12/2021 | Carrillo Ojeda | B32B 5/12 |
| 2022/0016848 | A1* | 1/2022 | Baranowski | G06T 7/60 |
| 2022/0019204 | A1* | 1/2022 | Maury | G06F 30/27 |
| 2022/0221388 | A1* | 7/2022 | Ramsauer | G01N 33/442 |
| 2022/0318754 | A1* | 10/2022 | Gleave | G06Q 10/103 |
| 2024/0144043 | A1* | 5/2024 | Helterhoff | G05B 13/0265 |

OTHER PUBLICATIONS

Hoogenboom, et al., "Combinatorial Methods, Automated Synthesis and High-Throughput Screening in Polymer Research: Past and Present", Macromol. Rapid Commun., 2003, 24, No. 1.

* cited by examiner

ACTIVELY LEARNING AND ADAPTING A WORKFLOW

BACKGROUND

Field

Certain aspects of the present disclosure generally relate to workflows in a research environment, more specifically, certain aspects of the present disclosure relate to systems and methods for actively learning a workflow and adapting the workflow.

Background

Generally, in a laboratory or research setting, an electronic data platform may capture a researcher's observations while performing a workflow (e.g., tests) in a laboratory environment. The results of the workflow may not be determined until the workflow has ended. Optimization of polymer synthesis is an example of a workflow. In such an example, the success of the workflow is not determined until the synthesis is completed. Such results may be obtained within hours or days after the workflow is completed. The workflow may be improved or modified based on an analysis of the researcher's observations as well as the results of the workflow. Therefore, the process of obtaining suitable results may be time-consuming. It may be desirable to improve a workflow process by providing real-time workflow analysis that actively modifies an on-going workflow to achieve desired results.

SUMMARY

In one aspect of the present disclosure, a method for adjusting a workflow includes obtaining, at a current time step, one or more samples from the workflow. The method further includes determining a set of sample parameters based on obtaining the one or more samples. Each sample parameter of the set of sample parameters may be associated with a respective sample of the one or more samples. The method still further includes generating an updated model by updating an initial model associated with the workflow based on determining the set of sample parameters. The method also includes adjusting one or more workflow parameters based on the updated model. A currently predicted end result of the workflow may converges with an expected end result of the workflow based on adjusting the one or more workflow parameters.

Another aspect of the present disclosure is directed to an apparatus including means for obtaining, at a current time step, one or more samples from the workflow. The apparatus further includes means for determining a set of sample parameters based on obtaining the one or more samples. Each sample parameter of the set of sample parameters may be associated with a respective sample of the one or more samples. The apparatus still further includes means for generating an updated model by updating an initial model associated with the workflow based on determining the set of sample parameters. The apparatus also includes means for adjusting one or more workflow parameters based on the updated model. A currently predicted end result of the workflow may converges with an expected end result of the workflow based on adjusting the one or more workflow parameters.

In another aspect of the present disclosure, a non-transitory computer-readable medium with non-transitory program code recorded thereon is disclosed. The program code is executed by a processor and includes program code to obtain, at a current time step, one or more samples from the workflow. The program code further includes program code to determine a set of sample parameters based on obtaining the one or more samples. Each sample parameter of the set of sample parameters may be associated with a respective sample of the one or more samples. The program code still further includes program code to generate an updated model by updating an initial model associated with the workflow based on determining the set of sample parameters. The program code also includes program code to adjust one or more workflow parameters based on the updated model. A currently predicted end result of the workflow may converges with an expected end result of the workflow based on adjusting the one or more workflow parameters.

Another aspect of the present disclosure is directed to an apparatus having a processor and a memory coupled with the processor and storing instructions operable, when executed by the processor, to cause the apparatus to obtain, at a current time step, one or more samples from the workflow. Execution of the instructions further cause the apparatus to determine a set of sample parameters based on obtaining the one or more samples. Each sample parameter of the set of sample parameters may be associated with a respective sample of the one or more samples. Execution of the instructions also cause the apparatus to generate an updated model by updating an initial model associated with the workflow based on determining the set of sample parameters. Execution of the instructions still further cause the apparatus to adjust one or more workflow parameters based on the updated model. A currently predicted end result of the workflow may converges with an expected end result of the workflow based on adjusting the one or more workflow parameters.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

As discussed, in a laboratory or research setting, an electronic data platform may capture a researcher's observations while performing a workflow (e.g., tests) in a laboratory environment. The results of the workflow may not be determined until the workflow has ended. As an example, polymer synthesis optimization is an example of a type of workflow. In such an example, the success of the workflow is not determined until the synthesis is completed. Such results may be obtained within hours or days after the workflow is completed. The workflow may be improved or modified based on an analysis of the researcher's observations as well as the results of the workflow. Therefore, the process of obtaining desirable results may be time-consuming. It may be desirable to improve a workflow process by providing real-time workflow analysis that actively modifies an on-going workflow to achieve desired results.

Aspects of the present disclosure are directed to an active workflow system that may adaptively configure one or more protocols associated with a workflow. A protocol refers to a series of instructions for a procedure. The procedure may be specified for a synthesis (for example, creating a new material), adding a component to an electrical system, testing a signal, or another type of measurement. For example, one protocol may provide a list of steps for testing signal interference. The active workflow system may infer a failure or success of a protocol based on a status function and/or based on feedback provided by an analyst associated with the test.

In some aspects, the active workflow system may be implemented via hardware and/or software. In such aspects, the hardware and/or software may be specified to analyze one or more protocols associated with a workflow. The analysis may be performed in real-time while the workflow is executed. The active workflow system may provide recommendations and/or improvements that may be implemented during execution of the workflow to obtain a successful result.

In some implementations, a hardware system in a testing environment, such as a laboratory, may use active workflow software with some prediction capabilities. In some configurations, the active workflow software may be associated with a machine learning model or another type of predictive software technology. In some such configuration, one or more hardware devices may use the active workflow software to allow backward and forward propagation based on physical models provided by a user and current phenomenon collected by the active workflow system. The combination of the active workflow software and the hardware may be referred to as the active workflow system.

In some examples, the active workflow system may be used to correct errors in real-time, or in substantial real-time, rather than waiting for an experiment to be completed. As an example, an experiment may fail because a temperature was greater than a threshold. In such an example, the temperature may be adjusted while the experiment is conducted based on an expected behavior output at each time step and/or another output of the active workflow system. The expected behavior may be output based on a previously provided physical model as well as information collected at each time step. Additionally, based on the information collected at each time step, the system may provide a revised physical model. In some examples, the information collected at each time step may be an example of a current observed behavior, which may include one or both of observable information (e.g., a color of a polymer solution precipitates within the solution) or analytical information (e.g., molecular weight).

Figure 1:
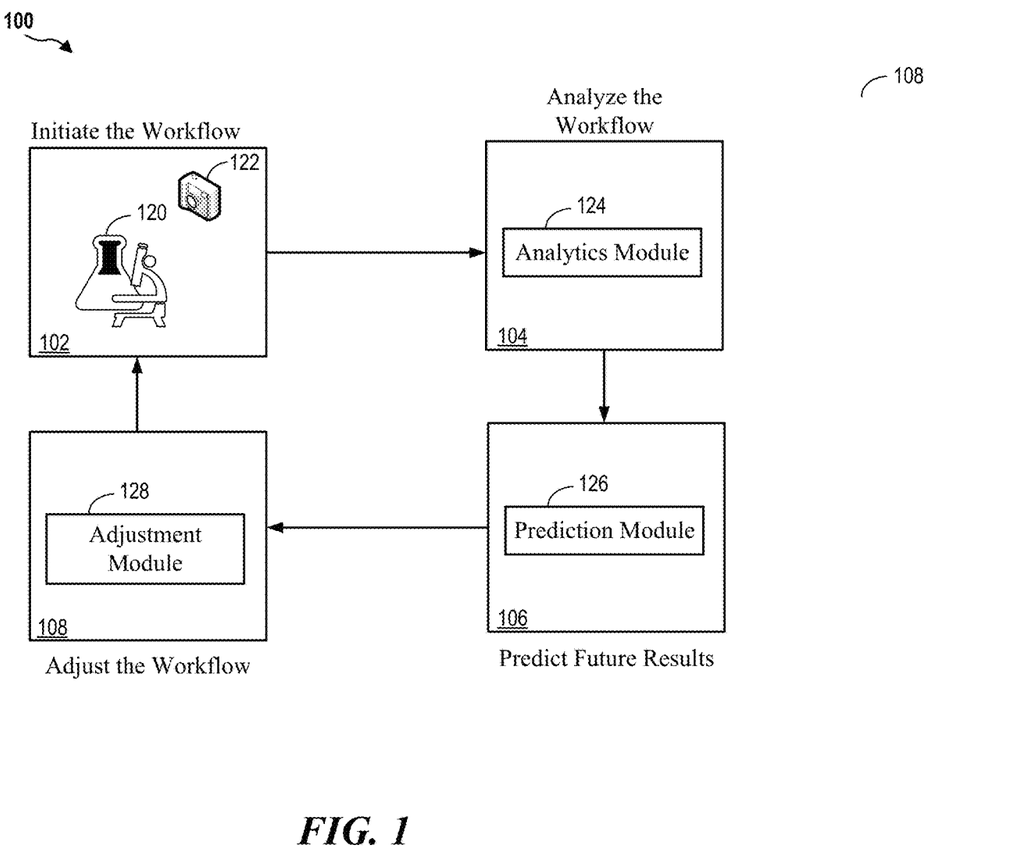
FIG. 1 is a block diagram illustrating an example of a process 100 performed by an active workflow system, in accordance with various aspects of the present disclosure.

FIG. 1 is a block diagram illustrating an example of a process 100 performed by an active workflow system, in accordance with various aspects of the present disclosure. The example process 100 is an example of an active workflow (e.g., experiment) and improving (e.g., optimizing) the active workflow in real-time based on observations and outputs of the active workflow system. As discussed, the active workflow system 100 is implemented with predictive software technology (e.g., active workflow software), such as a machine learning model, that is integrated with hardware 120, such as laboratory hardware. In the example of FIG. 1, the hardware 120 is testing equipment, such as a beaker and microscope found in a research environment. The hardware 120 is not limited to the laboratory hardware shown in FIG. 1, other types of hardware used to conduct tests or experiments may be examples of the hardware.

As shown in FIG. 1, the process 100 begins at block 102 by initiating the workflow. Initiation of a reaction may be an example of initiating the workflow. In such an example, a researcher may inject one or more reactants into the hardware 120, such as a reactant vessel, to create a mixture. The amount of each reactant may be specific based on the corresponding workflow. One or more monitoring devices 122, such as cameras or other types of sensors, may monitor the hardware 120. As an example, the monitoring devices 122 may visually capture a color of the mixture and/or viscosity of the mixture. The monitoring devices 122 may capture visual observations of the hardware 120 based on a schedule and/or based on an event, such as an observation of a certain reaction. The observations from the monitoring devices 122 may be output to an analytics module 124 to analyze the workflow at block 104.

Additionally, in some examples, physical samples may be obtained from the hardware 120 based on a schedule (e.g., periodically) and/or based on an event, such as an observation of a certain reaction. In one such example, a sample of the mixture may be extracted from the reactant vessel. The samples may be output to an analytics module 124 to analyze the workflow at block 104. The samples may be autonomously extracted by hardware (not shown in FIG. 1) and/or extracted by a researcher.

As discussed, the analytics module 124 may draw a sample of the mixture from the glassware, processes the sample, analyze the sample (e.g., using a fleet of characterization instruments). The sample may be predetermined amount of the reaction mixture, such as a fraction of a total amount of the reaction mixture. Aspects of the present disclosure are not limited to sampling mixtures, other types of elements may be sampled. As an example, the analytics module 124 may sample interference on a signal or signal strength. The analytics module 124 may include specific hardware for analyzing the physical samples and/or an analytics model for characterizing the physical samples and analyzing the output of the monitoring devices 122. As an example, the analytics module 124 may determine a color of the reactant based on an optical analysis of the output of the monitoring devices 122.

The analytics module 124 may provide results of the analysis of the workflow to a prediction module 126 that predicts results of the workflow at block 106. In some examples, the results received from the analytics module 124 may include one or more of an image obtained by the monitoring devices 122, a molecular weight of the sample, or a composition of the sample. The prediction module 126 may be implemented via software, such as a machine learning model. In some implementations, a researcher (e.g., user) provides an expected model, such as a physical model, associated with the workflow to the prediction module 126.

As an example, the model provided by the researcher may specify that a weight of a reactant may increase by a factor based on a temperature applied to the reactant. For example, the weight is a product of the temperature and a specific value. The researcher may then provide additional details associated with the workflow, such as starting material (e.g., ingredients of the mixture). Based on the input, such as the starting material, the prediction module 126 may predict expected measured properties and/or expected optical properties of the workflow at each time step. The user may provide one or more models, such as generic models, and also provide variables and/or constants that are specific to the reactant. The prediction module 126 may determine expected results for each model of the one or more models or a specific model of the one or more models provided by the user. The prediction module 126 may also predict expected measured properties for a final time step and/or expected optical properties of the workflow at the final time step. The measured properties and/or optical properties expected at the final time step may be predicted by the active workflow system based on a current model or provided by the user.

After generating the expected measured properties and/or expected optical properties, the prediction module 126 may compare, at each time step, actual measured properties and/or actual optical properties against the expected measured properties and/or expected optical properties. In one example, based on the model, the prediction module 126 may expect, for a current time step, a weight of a material to be 2 grams at 50° C. In this example, at the current time step, the actual weight of the material is 2.5 grams at 50° C.

In some examples, the prediction module 126 may update the physical model based on results collected from the analytics module 124. In some such examples, new expected measured properties and/or expected optical properties may be generated for future time steps, including a final time step, based on the update to the physical model. The physical model may be referred to as a user-input model.

As shown in FIG. 1, the prediction module 126 may provide a difference between actual results and expected results (e.g., expected measured properties and/or expected optical properties) to an adjustment module 128 at block 108 to update one or more current reaction parameters (e.g., temperature, stir rate, concentration of reactants) in order for the expected results and the actual results to converge. The adjustments may be provided in real-time. As an example, the expected final result may be 50 grams of material at 100° C. Based on both the expected final result and the difference between the actual result and expected result of the current time step, the adjustment module 128 may determine that a current temperature should be decreased to obtain the expected final result.

In some examples, the adjustment module 128 outputs the recommended adjustment to a researcher, such that the researcher may adjust one or more parameters of the hardware 120. Additionally, or alternatively, the adjustment module 128 may interact with the hardware 120 to autonomously adjust the one or more parameters to obtain the expected final result.

Particular aspects of the subject matter described in this disclosure may be implemented to realize one or more of the following potential advantages. In some examples, the described techniques may provide real-time updates of a user-input model and one or more parameters associated with the workflow, such as one or more parameters of the hardware 120 used in the workflow. As discussed, in conventional systems, the user waits for completion of the workflow (e.g., synthesis) to update the user-input model and one or more parameters associated with the workflow. In contrast, the described techniques provide real-time updates based on data points collected at each time step, thereby, improving a speed and accuracy of research.

Aspects of the present disclosure also improve an accuracy of predictions by user-input models by updating parameters used for the predictions in real-time. As an example, if an actual temperature is different than a predicted temperature, the prediction by the user-input model may be inaccurate if the parameters are not updated to reflect the actual temperature. Additionally, or alternatively, aspects of the present disclosure may improve the user-input model may updating the model after the experiment is complete. As an example, after the experiment is complete, the user-input model may be updated to better align with the observations collected during the experiment.

Figure 2:
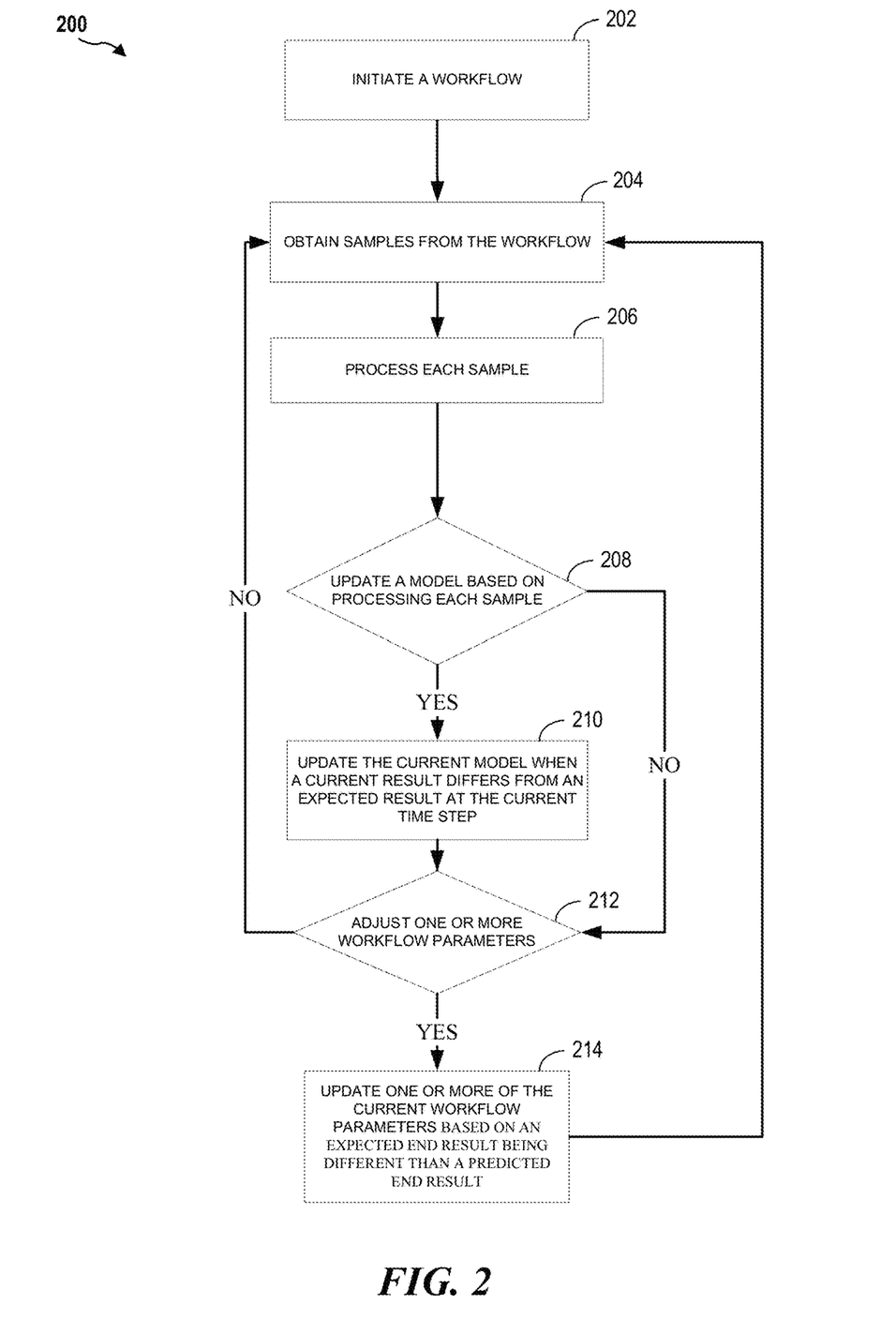
FIG. 2 is a flow diagram illustrating an example of a process performed by an active workflow, in accordance with some aspects of the present disclosure.

As discussed, the active workflow may adjust one or both of a user-provided or parameters associated with the workflow based on current results of the workflow. FIG. 2 is a flow diagram illustrating an example of a process 200 performed by an active workflow, in accordance with some aspects of the present disclosure. The active workflow may be implemented via hardware, such as the hardware 100 and/or the monitoring devices 122 described with reference to FIG. 1, and/or software, such as the software that implements the analytics module 124, the prediction module 126, and/or the adjustment module 128 described with reference to FIG. 1. The example process 200 is an example of adjusting one or both of a user-provided or parameters associated with the workflow based on the current results of the workflow.

As shown in FIG. 2, the process 200 begins at block 202, by initiating a workflow. As an example, a user may initiate the workflow to synthesize a new component. In one such example, the workflow is initialized to generate a new polymer, such as a new type of plastic, from a group of reactants (e.g., two or more reactants), such as propylene, ethylene, propylene, chlorine, sulfur, etc. A monomer may be an example of a reactant. Aspects of the present disclosure are not limited to synthesizing a new component, other types of workflows, such as signal processing workflows, are contemplated.

In some implementations, the workflow may be autonomously initiated by an autonomous device, such as a robotic device that is trained to perform one or more different workflows. The workflow may be initiated using hardware, such as the hardware 120 described with reference to FIG. 1.

During block 202, the reactants and other components, such as catalysts and/or solvents, may be loaded into reaction hardware, such as beakers, flasks, burners, etc. Additionally, one or more parameters, such as a temperature, a pressure, or a vacuum may be set for the reaction. The parameters may be set by the human or autonomous device. The workflow may be initiated after the parameters are set and the reactants and other components are loaded.

After initiating the workflow at block 202, the analytical module obtains samples of the workflow (block 204). In some examples, the sampling may be periodic. For example, a sample may be obtained once every hour. In other examples, a sampling time may be selected by the process 200 to obtain a highest density of relevant information. For example, if a property is expected to change exponentially, the process 200 may increase an amount of samples collected during the exponential change, and may decrease a number of samples collected during other stages of the experiment.

The sampling may be performed by one or more devices associated with the analytical module. As an example, a syringe associated with the analytical module may sample a portion of the reaction that was initiated at block 202. The analytical module may be a software component executed on a device, such as specially-purposed hardware, that controls one or more devices, such as a syringe and/or a camera, that sample the reaction stored in the workflow hardware. In some examples, the samples may include physical samples, such as a portion of the reaction mixture, and/or non-physical samples, such as images of the reaction mixture.

At block 206, each sample received at the analytics module may be processed via one or more processing steps. As an example, polymers may be precipitated into different solvents, such that different precipitates, such as solids, may be removed from the solvent. The solids may be dried for further analysis. In some examples, for the solid obtained from the sample, the analytics module may obtain one or more parameters associated with the solid based on the analysis. The analysis may include, for example, obtaining an image of the solid, determining a weight of the solid, processing the solid via gas chromatography, obtaining a composition of the solid, and/or performing other types of analysis. Additionally, or alternatively, the samples may be analyzed and processed prior to precipitating out (such as gas chromatography (GC), which can be performed before precipitation).

In some examples, the one or more parameters associated with the sample may be output to a prediction module, such as the prediction module 126 described with reference to FIG. 1. The prediction module may update one or both of a model or parameters associated with the workflow. In the example of FIG. 2, at block 208, the process 200 may determine whether to update the model based on processing each sample. As an example, 100 ML of a solution may be sampled by the analytics module. The analytics module may determine the weight of the solution is 5 mg and the conversion is thirty percent of the monomer. The analytics module may also determine that a dispersity of the solution is 1.3%. The dispersity measures an accuracy (e.g., precision) of a reaction. The prediction module may match the values received from the analytics module with other workflow parameters, such as concentration, temperature, and time, to determine whether a current model (e.g., user-input model).

As an example, the prediction module may determine whether the rate constant k follows a user-input model. The rate constant k may be determined as follows:

$$k = Ae^{-E_a/RT} \quad (1)$$

In EQUATION 1, the rate constant k may be defined as a weight over a volume of the reaction. Additionally, the parameter R represents a constant, the parameter T represents absolute temperature, the parameter A represents a prefactor that may be determined based on one or more parameters provided by the analytics module, such as the weight, composition, temperature, time, and/or dispersity. The parameter $E_a$ represents the activation energy of a reaction. This is specific to the reaction (in this case, the polymer synthesis reaction). The activation energy may not be time dependent. However, time-dependent information may be needed to extract the rate constant k. The rate constant k may be updated with each sample, which may update the parameter A and/or the activation energy $E_a$ In this example, the prediction module may solve for the activation energy $E_a$ at a current time step. The user-input model may be updated based on solving for the activation energy $E_a$ if the predicted the activation energy $E_a$ differs from an expected activation energy $E_a$, where the prediction module may have predicted the activation energy $E_a$ for the current time step based on an initial user-input model (Equation 1) or an update to the user-input model at a previous time step. That is, at block 210, the user-input model (e.g., current model) may be updated when a current result differs from an expected result at the current time step. Alternatively, the user-input model may not be updated if the current results are the same as the expected result, or within a tolerance of the expected results. For example, as shown in FIG. 2, the process 200 may proceed to block 212 to determine whether an adjustment module should adjust one or more workflow parameters. In some examples, not shown in the example of FIG. 2, when the model is not updated, the process 200 may return to block 204 to obtain samples from the workflow. Accordingly, the process of determining whether to update the model (block 208) may be repeated for each time step, and the model may be updated after each time step. In some examples, an expected result at each future time step may be updated based on updating the model at the current time step.

Additionally, the prediction module may provide an updated model, actual results, and/or a difference between actual results (e.g., current results) and expected results to an adjustment module, such as the adjustment module 128 described with reference to FIG. 1. At block 208, the adjustment module may determine whether to update one or more current workflow parameters, such as temperature, stir rate, concentration of reactants. At block 210, the adjustment module may update one or more of the current workflow parameters based on an expected end result being different than a predicted end result. The predicted end result may be determined based on the current model. The expected end result may be provided by a user and/or predicted by the prediction module or another module. The end result refers to a result that may be obtained at an end (e.g., last time step) of the workflow.

As an example, the current workflow parameters may be updated in order for the expected results and the actual results to converge. The workflow parameters may also be referred to as reaction parameters. The one or more current workflow parameters may be adjusted to obtain desired results. In a more specific example, the workflow may be initialized to obtain 180 grams of a solid at a dispersity of one. However, at a current rate, based on parameters determined by one or both of the analytics module or prediction module, the workflow may obtain 50 grams at a dispersity of 1.6. In such an example, the adjustment module may adjust one or more current workflow parameters to obtain the desired result (e.g., 180 grams of a solid at a dispersity of one) at a conclusion of the workflow. For example, the temperature of the workflow may be reduced from 100 C to 20 C. The adjustments may be implemented at a current time step or future time step. Additionally, the adjustments may be automatically implemented via software and or hardware associated with the workflow. As an example, the analytics module may communicate with a heating device, or an associated controller, to autonomously adjust an amount of heat applied to a reactant.

When the one or more workflow parameters are not updated, the process 200 may return to block 204 to obtain samples from the workflow. The one or more workflow parameters may not be updated when the expected end result is the same as, or within a tolerance of, the predicted end result Accordingly, the process of determining whether to update the one or more workflow parameters (block 212) may be repeated for each time step, and the model may be updated after each time step.

Figure 3:
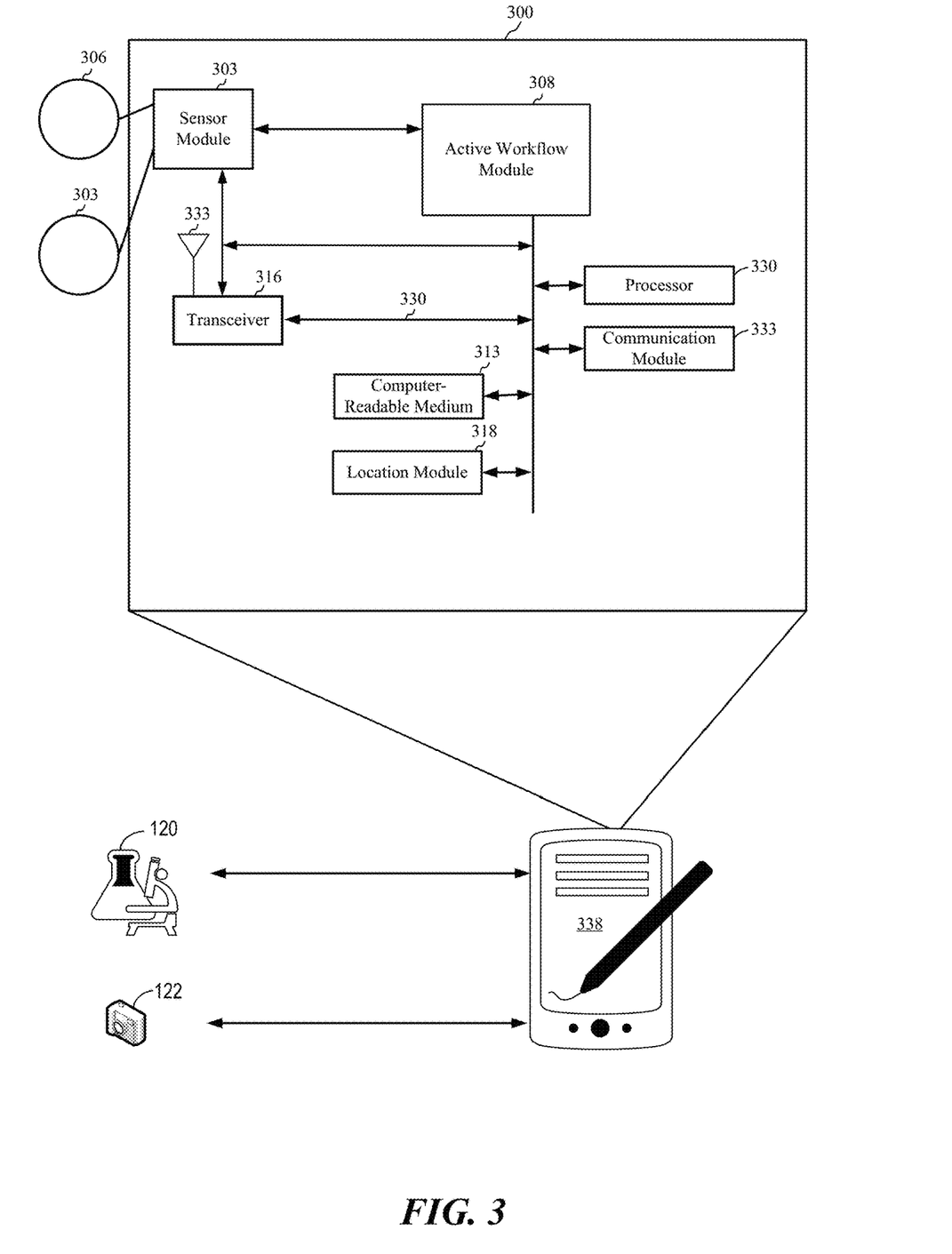
FIG. 3 is a diagram illustrating an example of a hardware implementation for component of an active workflow system, according to aspects of the present disclosure.

FIG. 3 is a diagram illustrating an example of a hardware implementation for component 300 of an active workflow system, according to aspects of the present disclosure. The component 300 may be a component of a tablet device, user equipment (UE), laptop, desktop, or another type of computing device. For example, as shown in FIG. 3, the component 300 is a component of a tablet 338. Aspects of the present disclosure are not limited to the component 300 being a component of the tablet 338. Additionally, as described, the active workflow system may be implemented on one or more components within a variety of environments. In some examples, one or more hardware components may be used to implement the active workflow system.

The component 300 may be implemented with a bus architecture, represented generally by a bus 330. The bus 330 may include any number of interconnecting buses and bridges depending on the specific application of the component 300 and the overall design constraints. The bus 330 links together various circuits including one or more processors and/or hardware modules, represented by a processor 330, a communication module 333, a location module 318, a sensor module 303, an acceleration module 336, and a computer-readable medium 313. The bus 330 may also link various other circuits such as timing sources, peripherals, voltage regulators, and power management circuits, which are well known in the art, and therefore, will not be described any further.

The component 300 includes a transceiver 316 coupled to the processor 330, the sensor module 303, an active workflow module 308, the communication module 333, the location module 318, the acceleration module 336, and the computer-readable medium 313. The transceiver 316 is coupled to an antenna 333. The transceiver 316 communicates with various other devices over one or more communication networks, such as an infrastructure network, a local area network, a wide area network, a cellular communication network, or another type of network. As an example, the transceiver 316 may transmit received data to a remote storage device for storage.

The component 300 includes the processor 330 coupled to the computer-readable medium 313. The processor 330 performs processing, including the execution of software stored on the computer-readable medium 313 providing functionality according to the disclosure. For example, the processor 330, working in conjunction with one or more of the modules 303, 308, 313, 316, 318, 330, 333, 336, may execute the software to causes the component 300 to perform the various functions described with reference to FIGS. 1, 2, and 4. In some examples, the processor 330 may perform one or more functions associated with one or more of the analytics module 124, prediction module 126, or the adjustment module 128. The computer-readable medium 313 may also store data that is manipulated by the processor 330 when executing the software.

The sensor module 303 may be used to obtain measurements via different sensors, such as a first sensor 306 and a second sensor 303. The first sensor 306 may be a temperature sensor, humidity sensor, and/or another type of environmental sensor. The second sensor 303 may be an environmental sensor or another type of sensor, such as a motion sensor. Of course, aspects of the present disclosure are not limited to the aforementioned sensors as other types of sensors, such as, for example, a camera, a thermal sensor, sonar sensor, and/or lasers are also contemplated for either of the sensors 303, 306.

The measurements of the first sensor 306 and the second sensor 303 may be processed by one or more of the processor 330, the sensor module 303, the active workflow module 308, the communication module 333, the location module 318, the acceleration module 336, in conjunction with the computer-readable medium 313 to implement the functionality described herein. In one configuration, the data captured by the first sensor 306 and the second sensor 303 may be transmitted to an external device via the transceiver 316. The first sensor 306 and the second sensor 303 may be coupled to the tablet 338 or may be in communication with the tablet 338.

The location module 318 may be used to determine a location of the tablet 338. For example, the location module 318 may use a global positioning system (GPS) to determine the location of the tablet 338. The communication module 333 may be used to facilitate communications via the transceiver 316. For example, the communication module 333 may be configured to provide communication capabilities via different wireless protocols, such as WiFi, long term evolution (LTE), 2G, IoT, etc. The communication module 333 may also be used to communicate with other components of the tablet 338 that are not modules of the component 200.

The active workflow module 308 work in conjunction with the processor 330, the communication module 333, the location module 318, the acceleration module 336, and/or the computer-readable medium 313. The active workflow module 308 may be configured to perform operations including operations of the process 400 described below with reference to FIG. 4. The active workflow module 308 may implement modules of FIG. 1, such as the analytics module 124, prediction module 126, or the adjustment module 128. For example, the active workflow module 308 may be configured to obtains, at a current time step, one or more samples from the workflow. The active workflow module 308 may also be configured to determine a set of sample parameters based on obtaining the one or more samples. Each sample parameter of the set of sample parameters may be associated with a respective sample of the one or more samples. The active workflow module 308 may also be configured to generate an updated model by updating an initial model associated with the workflow based on determining the set of sample parameters. Furthermore, the active workflow module 308 may also be configured to adjust one or more workflow parameters based on the updated model. The one or more workflow parameters may be adjusted, such that a currently predicted end result of the workflow converges with an expected end result of the workflow.

Figure 4:
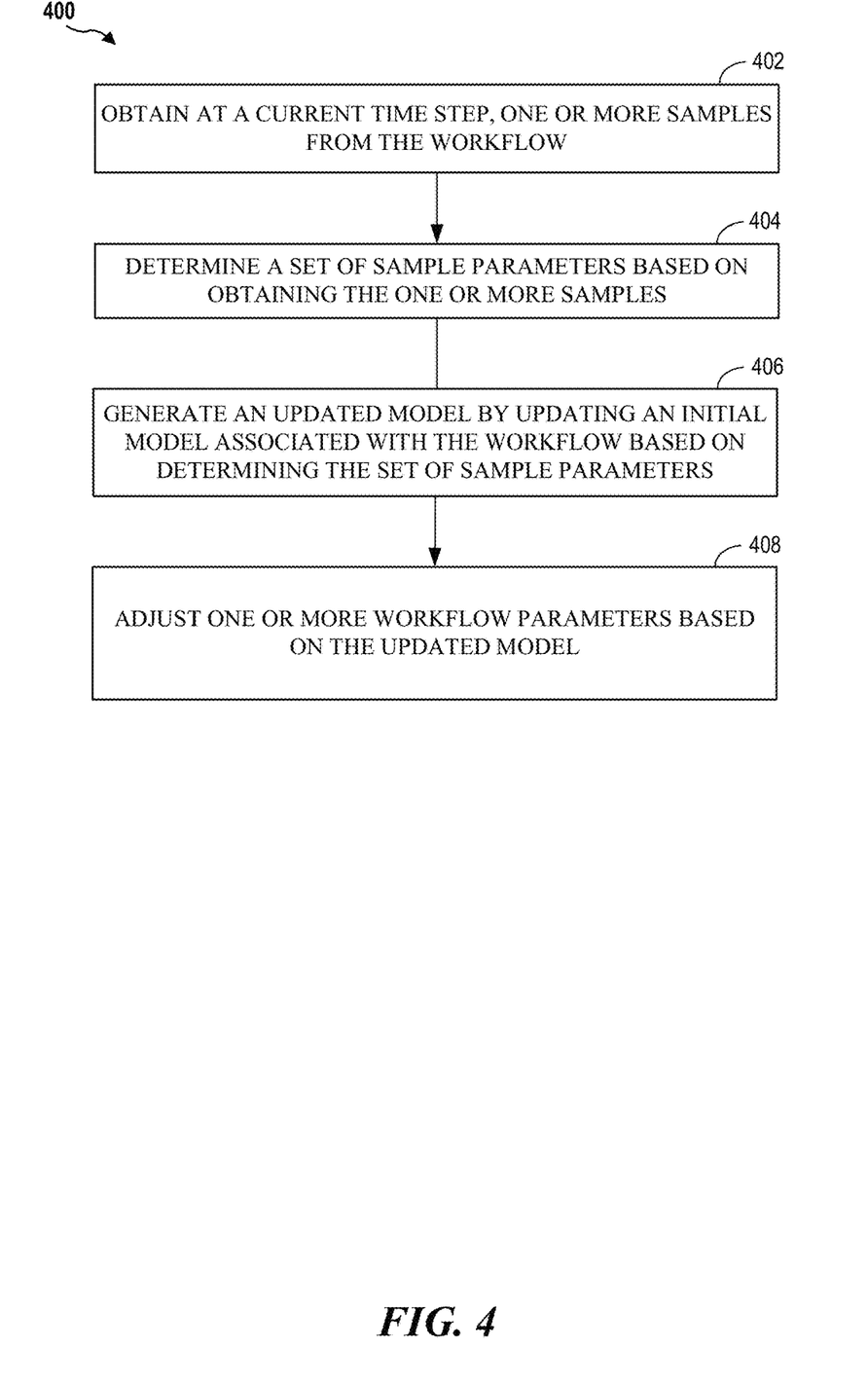
FIG. 4 illustrates a flow diagram for a method according to aspects of the present disclosure.

FIG. 4 illustrates a diagram illustrating an example process 400 for adjusting a workflow, in accordance with aspects of the present disclosure. The operations of the process 400 may be implemented by a component of an active workflow system, such as the component 300 described with reference to FIG. 3. For example, operations of the process 400 may be performed by active workflow module 308, as described with reference to FIG. 3. In some examples, a component of an active workflow system may execute a set of instructions to control the functional elements of the active workflow system to perform the operations or functions described below. Additionally, or alternatively, the component of an active workflow system may perform aspects of the operations or functions described below using special-purpose hardware.

As shown in FIG. 4, the process 400 begins at block 402 by obtaining, at a current time step, one or more samples from the workflow. In some examples, the workflow is associated with synthesizing a polymer. At block 404, the process 400 determines a set of sample parameters based on obtaining the one or more samples. Each sample parameter of the set of sample parameters may be associated with a respective sample of the one or more samples. Each sample of the one or more samples may be periodically collected via one or more sample collecting devices. The one or more sample collecting devices may include one or more of a camera, a syringe, an antenna, or a voltometer At block 406, the process 400 generates an updated model by updating an initial model associated with the workflow based on determining the set of sample parameters. In some examples, the process for generating the updated model includes analyzing each sample of the set of samples, determining based on the current model an expected result at the current time step, and determining, based on analyzing each sample of the set of samples, an actual result at the current time step. The current model may be adjusted based on the actual result being different than the expected result. In some examples, each sample may be analyzed by determining one or more of a weight of the sample, a composition of the sample, an signal strength of the sample, or a color of the sample.

At block 408, the process 400 adjusts one or more workflow parameters based on the updated model. Based on adjusting the one or more workflow parameters, a currently predicted end result of the workflow may converge with an expected end result of the workflow. In some examples, the expected end result may be determined based on the initial model or user-input. Additionally, the currently predicted end result may be determined based on the updated model. The one or more workflow parameters may include one or more of a temperature, a stir rate, or a concentration of reactants.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for adjusting a workflow via an active workflow device, comprising:

collecting, via one or more sample collecting devices, one or more samples from one or more instruments used to execute one or more instructions of a set of instructions associated with an initial model of the workflow for synthesizing a new material from a group of starting materials, each of the one or more sample collecting devices autonomously interacting with the one or more instruments to collect the one or more samples from the one or more instruments, the one or more samples being collected at a current timestep that is prior to a final timestep, an amount of samples included in the one or more samples being adjustable by the active workflow device based on a stage of the workflow and an expected rate of change of the group of starting materials;

determining, at the current timestep for the one or more samples, a set of sample parameters based on analyzing each of the one or more samples, the set of sample parameters including a weight parameter, a concentration parameter, a temperature parameter, a current time, and a dispersity parameter;

determining, based on the set of sample parameters associated with the current timestep and the group of starting materials, a first set of estimated final parameters associated with the new material synthesized at a final timestep of the workflow in accordance with the initial model, the first set of estimated final parameters including one or more of a final weight parameter or a final dispersity parameter;

updating the initial model associated with the workflow, to obtain an updated model, based on the first set of estimated final parameters being different than an expected set of estimated final parameters; and autonomously adjusting one or more workflow parameters of a group of working parameters in accordance with the updated model, the one or more workflow parameters being used by the one or more instruments to execute the one or more instructions at one or more time steps after the current time step, the one or more workflow parameters being adjusted such that a second set of estimated final parameters of the workflow, at the final timestep, converges with the expected set of estimated final parameters of the workflow, at the final timestep.

2. The method of claim 1, further comprising determining, for each sample of the one or more samples, one or more of a weight of the sample, a composition of the sample, a signal strength of the sample, or a color of the sample in accordance with analyzing each of the one or more samples.

3. The method of claim 1, further comprising:
determining the expected set of estimated final parameters based on the initial model or user-input; and
determining the second set of estimated final parameters based on the updated model.

4. The method of claim 1, wherein the one or more workflow parameters comprise one or more of a temperature, a stir rate, or a concentration of reactants.

5. The method of claim 1, wherein the one or more sample collecting devices include one or more of a camera, a syringe, an antenna, or a voltometer.

6. The method of claim 1, wherein:
the new material is a polymer; and
the group of starting materials is a group of reactants.

7. An active workflow device for adjusting a workflow, comprising:
one or more processors; and
one or more memories coupled with the one or more processors and storing instructions operable, when executed by the one or more processors, to cause the apparatus to:
collect, via one or more sample collecting devices, one or more samples from one or more instruments used to execute one or more instructions of a set of instructions associated with an initial model of the workflow for synthesizing a new material from a group of starting materials, each of the one or more sample collecting devices autonomously interacting with the one or more instruments to collect the one or more samples from the one or more instruments, the one or more samples being collected at a current timestep that is prior to a final timestep, an amount of samples included in the one or more samples being adjustable by the active workflow device based on a stage of the workflow and an expected rate of change of the group of starting materials;
determine, at the current timestep for the one or more samples, a set of sample parameters based on analyzing each of the one or more samples, the set of sample parameters including a weight parameter, a concentration parameter, a temperature parameter, a current time, and a dispersity parameter;
determine, based on the set of sample parameters associated with the current timestep and the group of starting materials, a first set of estimated final parameters associated with the new material synthesized at a final timestep of the workflow in accordance with the initial model, the first set of estimated final parameters including one or more of a final weight parameter or a final dispersity parameter;
update the initial model associated with the workflow, to obtain an updated model, based on the first set of estimated final parameters being different than an expected set of estimated final parameters; and
autonomously adjust one or more workflow parameters of a group of working parameters in accordance with the updated model, the one or more workflow parameters being used by the one or more instruments to execute the one or more instructions at one or more time steps after the current time step, the one or more workflow parameters being adjusted such that a second set of estimated final parameters of the workflow, at the final timestep, converges with the expected set of estimated final parameters of the workflow, at the final timestep.

8. The active workflow device of claim 7, wherein execution of the instructions further cause the apparatus to determine, for each sample of the one or more samples, one or more of a weight of the sample, a composition of the sample, an signal strength of the sample, or a color of the sample in accordance with analyzing each of the one or more samples.

9. The active workflow device of claim 7, wherein execution of the instructions further cause the apparatus to:
determine the expected set of estimated final parameters based on the initial model or user-input; and
determine the second set of estimated final parameters based on the updated model.

10. The active workflow device of claim 7, wherein the one or more workflow parameters comprise one or more of a temperature, a stir rate, or a concentration of reactants.

11. The active workflow device of claim 7, wherein the one or more sample collecting devices periodically collect each sample of the one or more samples.

12. The active workflow device of claim 7, wherein the one or more sample collecting devices comprise one or more of a camera, a syringe, an antenna, or a voltometer.

13. A non-transitory computer-readable medium having program code recorded thereon for adjusting a workflow by an active workflow device, the program code executed by a processor and comprising:
program code to collect, via one or more sample collecting devices, one or more samples from one or more instruments used to execute one or more instructions of a set of instructions associated with an initial model of the workflow for synthesizing a new material from a group of starting materials, each of the one or more sample collecting devices autonomously interacting with the one or more instruments to collect the one or more samples from the one or more instruments, the one or more samples being collected at a current timestep that is prior to a final timestep, an amount of samples included in the one or more samples being adjustable by the active workflow device based on a stage of the workflow and an expected rate of change of the group of starting materials;
program code to determine, at the current timestep for the one or more samples, a set of sample parameters based on analyzing each of the one or more samples, the set of sample parameters including a weight parameter, a concentration parameter, a temperature parameter, a current time, and a dispersity parameter;

program code to determine, based on the set of sample parameters associated with the current timestep and the group of starting materials, a first set of estimated final parameters associated with the new material synthesized at a final timestep of the workflow in accordance with the initial model, the first set of estimated final parameters including one or more of a final weight parameter or a final dispersity parameter;

program code to update the initial model associated with the workflow, to obtain an updated model, based on the first set of estimated final parameters being different than an expected set of estimated final parameters; and program code to autonomously adjust one or more workflow parameters of a group of working parameters in accordance with the updated model, the one or more workflow parameters being used by the one or more instruments to execute the one or more instructions at one or more time steps after the current time step, the one or more workflow parameters being adjusted such that a second set of estimated final parameters of the workflow, at the final timestep, converges with the expected set of estimated final parameters of the workflow, at the final timestep.

14. The non-transitory computer-readable medium of claim 13, wherein the program code further comprises program code to determine, for each sample of the one or more samples, one or more of a weight of the sample, a composition of the sample, an signal strength of the sample, or a color of the sample in accordance with analyzing each of the one or more samples.

15. The non-transitory computer-readable medium of claim 13, wherein the one or more workflow parameters comprise one or more of a temperature, a stir rate, or a concentration of reactants.

16. The non-transitory computer-readable medium of claim 13, wherein the one or more sample collecting devices periodically collect each sample of the one or more samples.

17. The non-transitory computer-readable medium of claim 13, wherein the one or more sample collecting devices comprise one or more of a camera, a syringe, an antenna, or a voltometer.

* * * * *